United States Patent [19]

Decroix et al.

[11] Patent Number: 5,772,922
[45] Date of Patent: Jun. 30, 1998

[54] NEUTRON-ABSORBING COMPOSITE MATERIAL AND ITS PRODUCTION PROCESS

[75] Inventors: Guy-Marc Decroix, Chevilly-Larue; Danièle Noaillac, Orsay; Jacques Chatillon, Verrières le Buisson; Yann Fraslin, Pornchet, all of France

[73] Assignee: Commissariat a l'Energie Atomique, Paris, France

[21] Appl. No.: 761,006

[22] Filed: Dec. 5, 1996

Related U.S. Application Data

[63] Continuation of Ser. No. 349,265, Dec. 5, 1994, abandoned.

[30] Foreign Application Priority Data

Dec. 10, 1993 [FR] France ................................. 93 14873

[51] Int. Cl.$^6$ ............................. C04B 35/66; C09K 3/00
[52] U.S. Cl. ........................................... 252/478; 501/49
[58] Field of Search ............................. 252/478; 501/49

[56] References Cited

U.S. PATENT DOCUMENTS

| | | | |
|---|---|---|---|
| 3,356,618 | 12/1967 | Didcot et al. | 252/478 |
| 3,516,948 | 6/1970 | Moselle et al. | 252/478 |
| 3,769,160 | 10/1973 | Shepherd et al. | 252/478 |
| 4,027,377 | 6/1977 | Roszler | 29/420.5 |
| 4,213,883 | 7/1980 | Owens | 252/478 |
| 4,252,691 | 2/1981 | Lipp et al. | 252/478 |
| 4,522,744 | 6/1985 | Argall et al. | 252/478 |
| 4,684,480 | 8/1987 | Lipp et al. | 252/478 |
| 4,826,630 | 5/1989 | Radford et al. | 252/478 |
| 5,156,804 | 10/1992 | Halverson et al. | 252/478 |
| 5,242,622 | 9/1993 | Boutin et al. | 252/478 |

FOREIGN PATENT DOCUMENTS 0 150 841  8/1985  European Pat. Off. .
2 646 007  10/1990  France .

Primary Examiner—Philip Tucker
Attorney, Agent, or Firm—Pearne, Gordon, McCoy & Granger LLP

[57] ABSTRACT

The invention relates to a neutron-absorbing composite material and its production process.

This material comprises a ceramic homogeneous matrix, e.g. of boron carbide $B_4C$ or BN, in which are dispersed calibrated or uncalibrated, e.g. 100 to 500 $\mu$m pseudospherical clusters (3) formed from refractory metals such as Mo, molybdenum boride and/or $B_4C$.

As a result of the presence of these clusters, improved mechanical properties are obtained compared with those of pure $B_4C$.

5 Claims, 3 Drawing Sheets

NEUTRON-ABSORBING COMPOSITE MATERIAL AND ITS PRODUCTION PROCESS

This is a continuation of application Ser. No. 08/349,265, filed Dec. 5, 1994 now abandoned.

DESCRIPTION

The present invention relates to a neutron-absorbing composite material and to its production process.

A material of this type can more particularly be used in nuclear reactors such as pressurized water reactors and fast neutron reactors.

At present, the most widely used neutron-absorbing material in nuclear reactors is boron carbide $B_4C$, because the material is inexpensive, it is possible to modify its effectiveness by acting both on its $^{10}B$ isotope content and on its density and which also has good chemical inertia properties and a highly refractory character. In general, it is used in the form of cylindrical pellets stacked in metal sheaths in order to form the control rods of reactors.

However, it suffers from the disadvantage of a poor behaviour under irradiation due to unsatisfactory thermomechanical properties (low thermal conductivity and fragile nature), which limit its life. Thus, the emission of heat due to neutron captures (n, alpha) is sufficient to induce its fracturing, because the very high thermal gradients (up to 1000° C./cm in a fast neutron nuclear reactor) resulting therefrom, lead to the establishment of stresses exceeding the strength of the material. Moreover, the generation of large quantities of helium leads to a significant swelling of the material and to microscopic cracking, which in the long term can lead to a complete disintegration of the pellets.

The solutions adopted at present for getting round these problems consisting of limiting the use of boron carbide to weak flux areas in pressurized water reactors, or the insertion of a jacket between the $B_4C$ pellets and the sheath containing the same in order to collect fragments in the case of fast neutron nuclear reactors, constitute nothing more than a last resource. Thus, research has been carried out for developing materials having a better behaviour under irradiation than that of boron carbide, whilst retaining the greatest possible neutron absorption efficiency.

It is known that the thermomechanical properties of a ceramic can be improved by using various reinforcing processes, such as the introduction in large quantities of a second phase formed from whiskers, ceramics or metals.

In the case of whiskers, the reinforcement is ensured by the high resistance to fracturing of the whiskers. In the case of ceramics, the reinforcement is obtained by the existence of residual stress fields in the material or large concentrations of microcracks, which prevent the free propagation of cracks by deflection, dispersion, etc. In the case of metals, use is made of the plasticity and thermal conductivity properties of the metal.

Thus, R. Rüh et al studied in J. Am Ceram. Soc., 75(4), 1992, pp.864–872 and J. Am Ceram. Soc., 75(10), 1992, pp.2887–2890 the influence of the addition of boron nitride to the thermal conductivity of boron carbide in composite materials based on boron carbide and boron nitride, prepared by the hot compression of a mixture of $B_4C$ and BN powders with a grain size below 30 $\mu$m and also subject to a grinding operation.

U.S. Pat. No. 4,661,155 describes a composite material incorporating a boron carbide and a metal bonding phase constituted by molybdenum, for tools for machining metals, ceramics and glasses. This material is prepared by the hot compression of a homogeneous mixture of Mo and $B_4C$ powders.

The composite materials described hereinbefore have microstructures corresponding to a homogeneous dispersion of fine BN or Mo particles in a fine grain $B_4C$ matrix. This structure leads to better fracture resistance properties than those of $B_4C$ alone, but the behaviour under stress of the material still remains fragile, whereas it would be of interest to obtain a behaviour under stress of the pseudoplastic type in the case of neutron-absorbing materials used in nuclear reactors. The composite material can certainly crack, but it still retains its integrity.

The present invention relates to a neutron-absorbing composite material having improved properties compared with those of known materials based on $B_4C$, as a result of the choice of a ceramic matrix and an appropriate reinforcement.

According to the invention, the neutron-absorbing composite material comprises a homogeneous matrix of a first component constituted by a ceramic material in which are homogeneously dispersed clusters of at least one second component chosen from among refractory metals, molybdenum borides and $B_4C$, at least one of the two components incorporating boron.

Therefore the material according to the invention is a composite material of the ceramic—ceramic or ceramic—metal type in which the reinforcement is ensured by the clusters of molybdenum boride, boron carbide and/or refractory metal.

The reinforcement due to these clusters is due to the existence of residual stress fields in the material leading to a deflection of the cracks, the presence of a small interface between the cluster and the matrix constituting a preferred path for a crack, or the bridging of the crack (sealing forces) for the largest (ductile) clusters which prevent the free propagation of the cracks.

In order to obtain these results, it is consequently important that the clusters have appropriate dimensions. In general, they are pseudospherical clusters with dimensions in the range 100 to 500 $\mu$m. In addition, the material must contain an adequate quantity of clusters.

When the clusters are of refractory metal they are calibrated. Their quantity must not be excessive, so as not to prejudice the neutron absorption effectiveness of the material. In this case, the refractory metal quantity is generally at the most equal to 300% by volume of the material.

In the case where the clusters are of boron carbide, they are calibrated or uncalibrated and preferably represent most of the material, i.e. 60 to 80% by volume thereof.

In the composite material according to the invention, the refractory metals which can be used are those having a melting point above 2200° C. As examples of such metals reference can be made to hafnium, zirconium and molybdenum, more particularly molybdenum because it is highly refractory, its melting point is 2600° C. and it has an excellent thermal conductivity.

The ceramic materials usable for forming the composite material matrix are preferably ceramic materials incorporating boron and in particular ceramic materials constituted by $B_4C$ and BN.

In addition, according to a first embodiment of the invention, the ceramic matrix is $B_4C$ and use is made of calibrated molybdenum and/or molybdenum boride clusters, because they have remarkable properties with said matrix.

Thus, with boron carbide, molybdenum is particularly interesting, because apart from its highly refractory nature and excellent thermal conductivity, it has a limited chemical compatibility with $B_4C$, a good chemical compatibility with carbon and a thermal expansion coefficient higher than that of $B_4C$.

The limited chemical compatibility with $B_4C$ is of interest, because it leads to a diffusion of boron to molybdenum, which is a reinforcement-favourable factor (weak free carbon interface between the clusters and the matrix).

The good chemical compatibility with the carbon makes it possible to use for the production of the composite material the same processes as those used for $B_4C$. The molybdenum boronation speed inhibits the reaction: $Mo+C \rightarrow MoC$.

The thermal expansion coefficient exceeding that of $B_4C$ makes it possible to establish residual stresses favourable for the reinforcement.

With this boron carbide $B_4C$ matrix containing calibrated clusters based on molybdenum, a composite, finegrain material is obtained with a homogeneous dispersion of the boron carbide matrix and a homogeneous distribution of the spherical clusters within the matrix. In addition, with molybdenum there is a residual porosity in the molybdenum clusters and a partial or complete disappearance of molybdenum, whose place is taken by borides such $Mo_2B_5$ as a result of the diffusion of boron from the $B_4C$ matrix to the molybdenum clusters leading to the presence of an amorphous carbon interface between the matrix and the cluster.

The reinforcement is then assured by the ductile nature of the clusters, as well as by the deflection of the cracks (weak interface due to the diffusion of boron $B_4C$ to the Mo).

According to a second embodiment of the invention, the ceramic matrix is boron nitride BN and the clusters are calibrated or uncalibrated $B_4C$ clusters.

With this structure, a fine-grain material, a homogeneous dispersion of the boron nitride matrix and a homogeneous distribution of the boron carbide clusters with good thermomechanical properties are obtained.

The composite materials according to the invention can be prepared by powder metallurgy from a powder of the first component and calibrated or uncalibrated clusters of the second component or components.

Thus, the invention also relates to a process for the preparation of said neutron-absorbing composite material consisting of homogeneously mixing a powder of the first component with an average grain size below 5 µm with clusters of the second component or components and then densifying the mixture by sintering under pressure at a temperature and for a time adequate for obtaining a final density at least equal to 90% of the theoretical density.

The calibrated or uncalibrated clusters of the second component can be prepared from a very fine powder of the second component, e.g. having a grain size below 5 µm, by subjecting the powder to baking under vacuum and under a neutral atmosphere e.g. at a temperature exceeding 1000° C. and then by grinding the baked product and screening the ground product so as to only retain the clusters of a desired size, e.g. 100 to 500 µm (in the case where they are calibrated).

For baking purposes, the temperature is chosen as a function of the initial grain size of the powder and so as to ensure subsequent easy grinding.

For the powder of the first component, it is possible to obtain a homogeneous powder by dispersing a powder of said first component as homogeneously as possible, e.g. by ultrasonic application, in a slop and then drying and screening the powder. In order to mix the said powder with calibrated or uncalibrated clusters, conventional mixing procedures can be used.

This can be followed by the densification of the mixture by hot uniaxial compression or by hot isostatic compression, using in the first case a graphite matrix and in the second a refractory metal envelope, e.g. of titanium. The pressure, temperature and duration of the sintering are chosen as a function of the ceramic material used for obtaining the final desired density at least equal to 90% of the theoretical density.

When the ceramic material is boron carbide, the sintering pressure is generally 20 to 200 mpa, the centring temperature is generally between 1800° and 2200° C. and the sintering time can be between 15 and 60 minutes.

When the ceramic material is boron nitride BN, the sintering pressure can be 20 to 200 mpa, the sintering temperature 1800° to 2200° C. and the fritting time 15 to 60 min.

The invention is described in greater detail hereinafter relative to non-limitative examples and with reference to the attached drawings, wherein show:

EXAMPLE 1

Preparation of a Composite Material with a $B_4C$ Matrix Reinforced by Mo Calibrated Clusters The starting product is a $B_4C$ powder with a grain size below 5 µm and said powder is dispersed as homogeneously as possible, e.g. by ultrasonic application, in an alcohol slop, followed by drying and screening thereof.

In addition, preparation takes place of calibrated Mo clusters from a Mo powder having a grain size below 5 µm. Said powder is introduced into a graphite mould and is baked in vacuo at a temperature of 1200° C. for 1 h. The baked product is then ground and screened in order to retain the clusters with a grain size from 100 to 500 µm. The boron carbide powder is then mixed with the thus prepared, calibrated Mo clusters, so that the Mo quantity represents 20% by volume of the mixture.

From said mixture are then prepared pellets having a diameter of 17 mm and a height of 30 mm by introducing the mixture into a graphite mould and performing a uniaxial compression in a furnace at a temperature of 2100° C., under a pressure of 60 mPa and for 1 hour. This gives a composite material pellet incorporating a boron carbide matrix reinforced by calibrated Mo clusters, which have at least partly been transformed during sintering into molybdenum boride.

Figure 1:
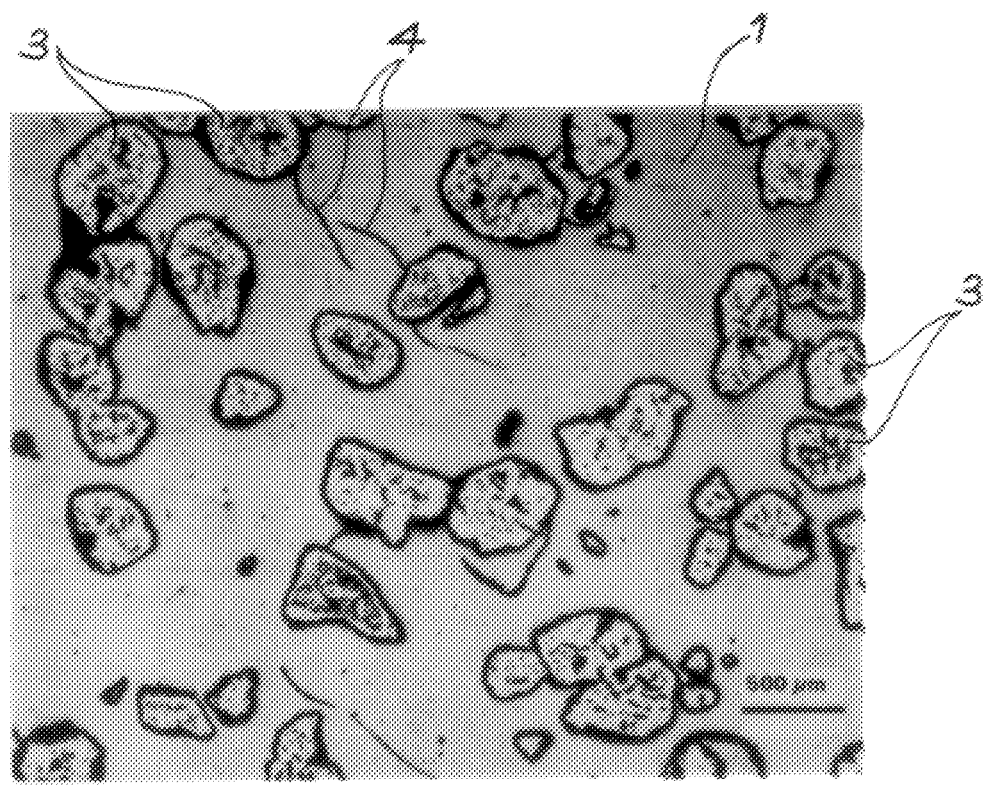
FIG. 1 A micrograph illustrating the structure of an absorbent composite material having a $B_4C$ matrix reinforced by Mo calibrated clusters.

FIG. 1 is a micrograph of the material obtained with a 20× magnification. FIG. 1 shows the $B_4C$ matrix 1 in which are homogeneously dispersed the Mo-based, calibrated clusters formed from molybdenum borides. The black line around these clusters represents the weak or small carbon interface. The presence of residual stresses in the material leads to the microcracks 4.

EXAMPLE 2

Production of a Composite Material with a Boron Nitride (BN) Matrix Reinforced by Uncalibrated $B_4C$ Clusters (Conglomerates)

The starting product is a BN powder and a $B_4C$ powder having grain sizes below 5 μm. The $B_4C$ and BN powders are screened to approximately 150 μm (100 to 300 μm) and then mixed, the BN quantity being 30% by volume.

The mixture is then densified by sintering under load (uniaxial or isostatic) at 2100° C., under 60 mPa and for 1 h, to obtain a final density exceeding 90%.

Figure 2:
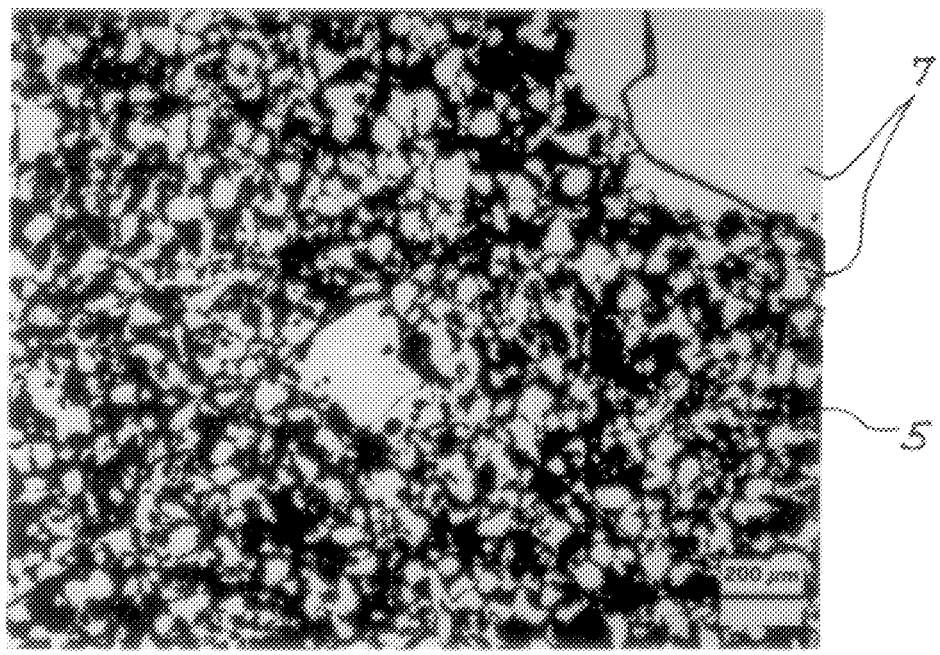
FIG. 2 A micrograph illustrating the structure of an absorbent composite material having a BN matrix reinforced by uncalibrated $B_4C$ clusters.

FIG. 2 shows the microstructure of the material obtained with a 20× magnification. It can be seen that the material comprises a boron nitride matrix 5, in which are distributed $B_4C$ conglomerates of varying size and which are in this case obtained in natural manner by screening.

EXAMPLE 3

Preparation of a Composite Material Incorporating a BN Matrix, in which are Homogeneously Distributed Calibrated $B_4C$ Clusters The same operating procedure as in example 1 is followed, except that in this case calibrated pseudospherical clusters are formed from $B_4C$ powder and the BN powder, which has a grain size below 5 μm, is treated in the same way as the $B_4C$ powder in example 1.

The BN powder is then mixed with the calibrated $B_4C$ clusters, so that the BN quantity represents 20% by volume of the mixture.

This is followed by the preparation from the mixture of pellets with a diameter of 17 mm and a height of 25 mm by introducing the mixture into a graphite mould and performing a uniaxial compression of the mixture in a furnace at a temperature of 2100° C., under a pressure of 60 mPa and for 1 hour.

Figure 3:
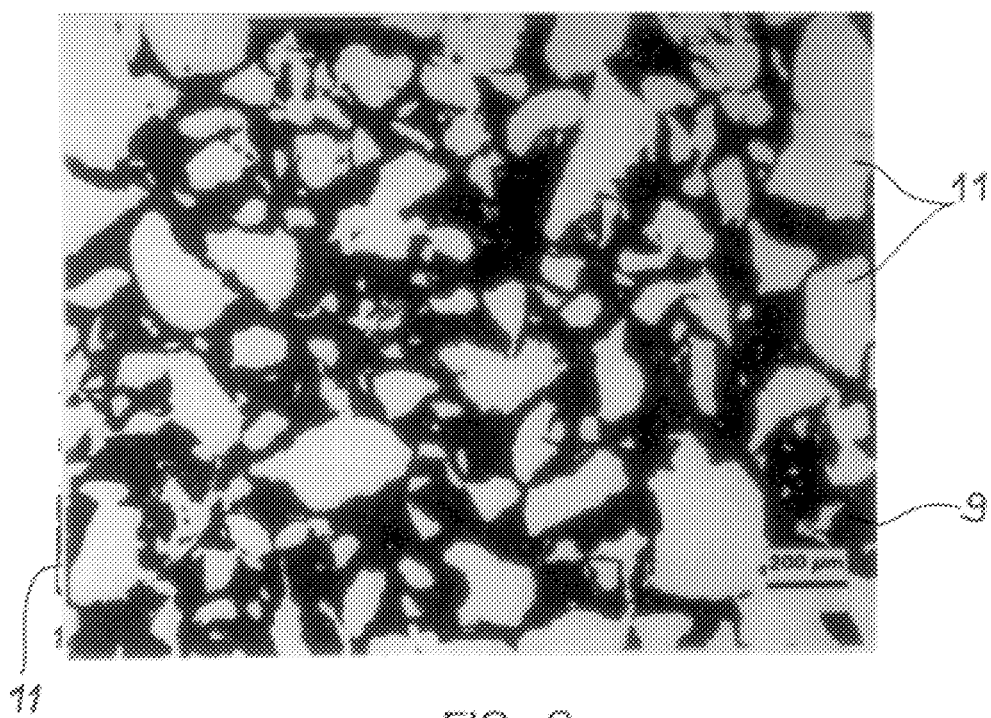
FIG. 3 A micrograph illustrating the structure of a composite material having a BN matrix reinforced by calibrated $B_4$ C clusters.

FIG. 3 shows the microstructure of the material obtained. It is possible to see therein the BN matrix line, within which are dispersed calibrated $B_4C$ clusters 11.

The composite materials of examples 1 to 3 demonstrated a resistance to fracturing by thermal shocks more than twice higher than that of a pure boron carbide having the same relative density. In the same way, the thermal diffusivity of the composites is much higher than that of boron carbide. Finally, their mechanical properties, relative to $B_4C$, are extremely favourable, because their apparent modulus of elasticity is twice lower and their behaviour under stress is much better, as can be seen from FIGS. 4 and 5.

Figure 4:
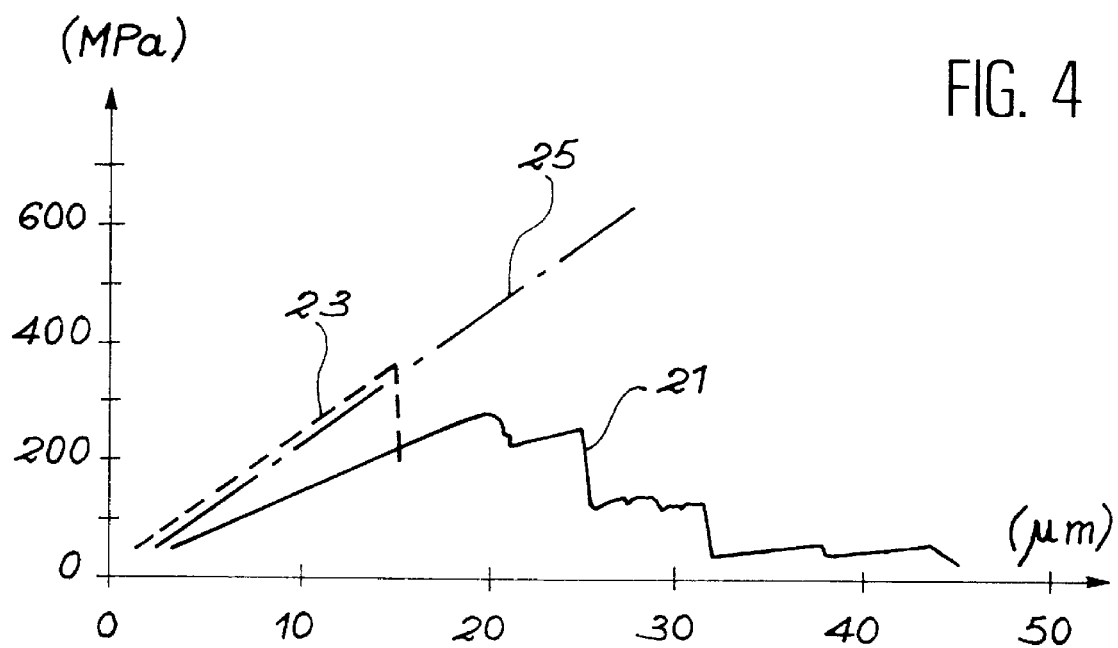
FIGS. 4 and 5 Graphs showing the stress-deformation behaviour of materials according to the invention and prior art materials.

FIG. 4 shows the deformation behaviour of the composite material of FIG. 1, namely the deformation (in micrometres) as a function of the stress applied (in mPa). It can be seen that the composite material according to the invention (curve 21) has a fracture-free pseudoplastic behaviour. However, curve 23 relating to the pure $B_4C$ tested under the same conditions, has a fracture at 350 mPa and curve 25 relating to a homogeneous $B_4C$—Mo material prepared from $B_4C$ and Mo powders having very small grain sizes illustrates the fragile behaviour of this material.

Figure 5:
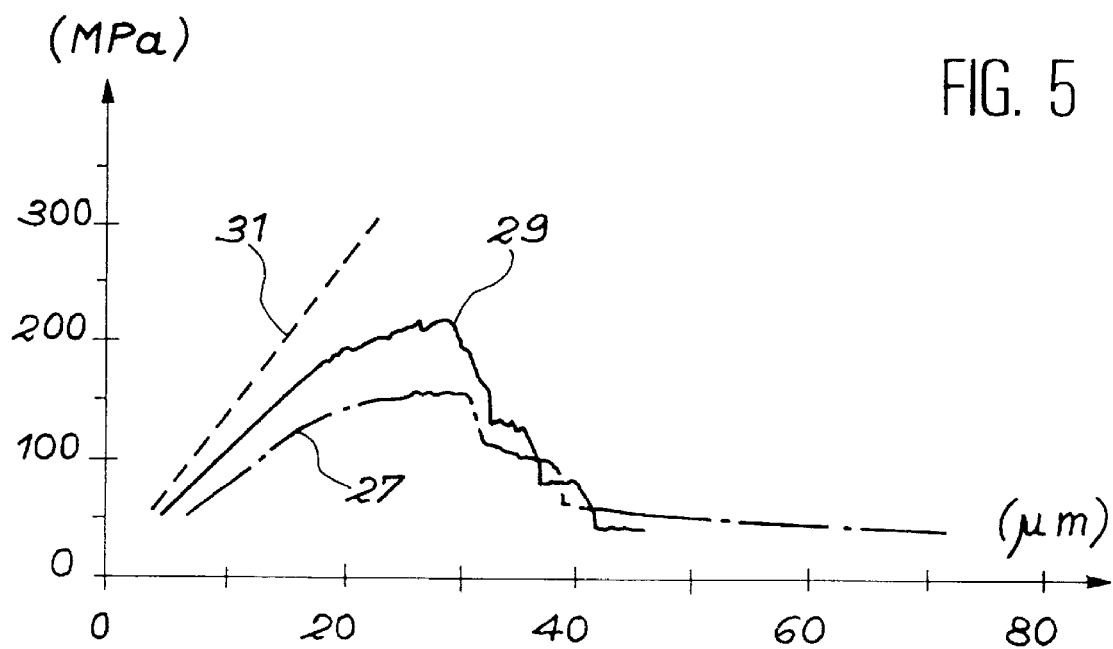

FIG. 5 shows the behaviour under stress of the composite materials obtained in examples 2 and 3. Curve 27 relates to example 3, curve 29 to example 2 and curve 31 to a material formed by powder metallurgy from a homogeneous mixture of $B_4C$ and BN having substantially identical, small grain sizes.

FIG. 5 makes it clear that there is a fragile behaviour in the case of the homogeneous material $B_4C$—BN and a pseudoplastic behaviour of the materials of examples 2 and 3.

Thus, the composite materials according to the invention have much better properties than those of pure $B_4C$ and composite materials of $B_4C$—Mo or $B_4C$—BN according to the prior art.

We claim:

1. Neutron-absorbing composite material consisting of a homogeneous matrix of a first component constituted by a ceramic selected from the group consisting of boron carbide and boron nitride in which are homogeneously dispersed clusters of at least one second component chosen from refractory metals, molybdenum borides and $B_4C$, at least two of said components being different, said refractory metals being selected from the group consisting of Mo and Zr, said clusters ranging in size from 100 to 500 μm.

2. Material according to claims 1, wherein the second component is a refractory metal and/or a molybdenum boride, in that the clusters are calibrated clusters and in that the material also comprises 30% by volume of the second component.

3. Material according to claim 2, wherein the ceramic is boron carbide and in that the calibrated clusters are clusters of Mo and/or molybdenum boride.

4. Material according to claim 1, wherein the clusters are $B_4C$ and represent 60 to 80% by volume of the material.

5. Material according to claim 1, wherein the ceramic is a boron nitride and that the clusters are calibrated or uncalibrated $B_4C$ clusters.

* * * * *